United States Patent
Hsiao et al.

(10) Patent No.: US 6,913,704 B2
(45) Date of Patent: Jul. 5, 2005

(54) MAGNETIC HEAD INDUCTION COIL FABRICATION METHOD UTILIZING ASPECT RATIO DEPENDENT ETCHING

(75) Inventors: Richard Hsiao, San Jose, CA (US); Yiping Hsiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 238 days.

(21) Appl. No.: 10/302,244

(22) Filed: Nov. 21, 2002

(65) Prior Publication Data

US 2003/0076626 A1 Apr. 24, 2003

Related U.S. Application Data

(62) Division of application No. 09/638,665, filed on Aug. 14, 2000, now Pat. No. 6,515,826.

(51) Int. Cl.[7] .............................................. C03C 15/00
(52) U.S. Cl. .............................. 216/22; 216/52; 216/67; 216/72; 216/74; 216/75
(58) Field of Search .............................. 216/22, 52, 67, 216/72, 74, 75

(56) References Cited

U.S. PATENT DOCUMENTS

| | | | |
|---|---|---|---|
| 4,318,148 A | 3/1982 | Kaminaka et al. .......... 360/123 |
| 4,416,056 A | 11/1983 | Takahashi .................. 29/602.1 |
| 5,113,300 A | 5/1992 | Ikeda et al. ................. 360/123 |
| 5,643,824 A | 7/1997 | Chien et al. | |
| 5,734,534 A | 3/1998 | Yamamoto et al. ......... 360/123 |
| 5,814,547 A | 9/1998 | Chang et al. | |
| 5,827,437 A | 10/1998 | Yang et al. | |
| 5,872,693 A | 2/1999 | Yoda et al. ................. 360/126 |
| 6,178,070 B1 * | 1/2001 | Hong et al. ................ 360/317 |
| 6,191,916 B1 | 2/2001 | Sasaki ........................ 360/123 |
| 6,191,918 B1 | 2/2001 | Clarke et al. ............... 360/126 |
| 6,204,997 B1 | 3/2001 | Sasaki ........................ 360/123 |
| 6,246,541 B1 | 6/2001 | Furuichi et al. ............ 360/123 |
| 6,304,414 B1 | 10/2001 | Crue et al. .................. 360/123 |
| 6,320,726 B1 | 11/2001 | Sasaki ........................ 360/123 |
| 6,350,556 B1 * | 2/2002 | Asanuma .................... 430/313 |

FOREIGN PATENT DOCUMENTS

JP   05267251   10/1993
JP   10-83520    3/1998

* cited by examiner

Primary Examiner—Nadine G. Norton
Assistant Examiner—Binh X. Tran
(74) Attorney, Agent, or Firm—Robert O. Guillot; Intellectual Property Law Offices (57) ABSTRACT

A magnetic head including a dual layer induction coil. Following the deposition of a first magnetic pole (P1) a first induction coil is fabricated. Following a chemical mechanical polishing (CMP) step a layer of etchable insulation material is deposited followed by the fabrication of a second induction coil etching mask. A reactive ion etch process is then conducted to etch the second induction coil trenches into the second etchable insulation material layer. The etching depth is controlled by the width of the trenches in an aspect ratio dependent etching process step. The second induction coil is next fabricated into the second induction coil trenches, preferably utilizing electrodeposition techniques. Thereafter, an insulation layer is deposited upon the second induction coil, followed by the fabrication of a second magnetic pole (P2) upon the insulation layer.

6 Claims, 6 Drawing Sheets

MAGNETIC HEAD INDUCTION COIL FABRICATION METHOD UTILIZING ASPECT RATIO DEPENDENT ETCHING

CROSS-REFERENCE TO RELATED APPLICATION

This application is a divisional of U.S. patent application Ser. No. 09/638,665 filed Aug. 14, 2000, now U.S. Pat. No. 6,515,826.

BACKGROUND OF THE INVENTION

1. Field of the Invention

The present invention relates generally to magnetic heads for hard disk drives, and more particularly to magnetic heads having multiple layer write head induction coils, and methods for the fabrication thereof utilizing aspect ratio dependent etching such as the reactive ion etch (RIE) lag phenomena.

2. Description of the Prior Art

Magnetic heads commonly include write heads having two magnetic pole members and a flat, spiral induction coil disposed therebetween. Write head electrical current that passes through the induction coil creates a magnetic flux in the two magnetic pole members, and the magnetic flux passes through a write head pole tip, to write magnetic data bits onto the media, such as a hard disk, that is disposed proximate the pole tip. To improve the performance characteristics of write heads, efforts have been directed to increasing the magnetic flux that is generated by the induction coil in order to increase the magnetic field at the pole tip, such that data bits can more easily and reliably be written onto the magnetic media.

One prior art method for increasing the write head magnetic flux is to increase the number of induction coil turns that are fabricated between the two magnetic pole pieces. These efforts have lead to redevelopment of multiple layered induction coils. However, such multiple layer induction coils, as are known in the prior art, are generally difficult to reliably fabricate. Specifically, the prior art dual coil fabrication methods have generally employed well known photolithographic techniques which have resulted in problems related to the difficulty of removing the plating seed layer between coil turns, as well as a difficulty in filling the space between coil turns with alumina, or a similarly acceptable insulation material, following the plating of the coil turns. The present invention utilizes a selective plasma etching fabrication technique that takes advantage the aspect ratio dependent etching properties of the well known RIE lag phenomena, wherein etched structures having differing widths are etched to differing depths, to avoid the prior art problems.

SUMMARY OF THE INVENTION

The magnetic head of the present invention includes an induction coil and electrical interconnects that are fabricated in one step using an aspect ratio dependent etching process known as the RIE lag phenomena. A specific embodiment includes a dual layer induction coil having coil turns that are more accurately and reliably spaced due to the use of reactive ion etching fabrication techniques. Following the fabrication of the first magnetic pole (P1) an etch stop layer is deposited. Thereafter, a layer of an etchable insulation material is deposited, followed by the fabrication of an induction coil etching mask thereon. Utilizing a reactive ion etch process, induction coil trenches are thereafter etched into the etchable insulation material down to the etch stop layer. The first induction coil is then fabricated into the induction coil trenches, preferably utilizing standard electrodeposition techniques. Following a chemical mechanical polishing (CMP) step to remove excess induction coil material and the first induction coil etching mask, a second induction coil structure is fabricated upon the first induction coil. Initially, a second layer of etchable insulation material is deposited upon the first induction coil structure, followed by the fabrication of a patterned second induction coil etching mask upon the second etchable insulation material layer. A second reactive ion etch process is then conducted to etch the second induction coil trenches and electrical interconnect trenches into the second etchable insulation material layer. Significantly, the pattern openings for the induction coil trenches are narrower than the openings for the electrical interconnect trenches. The RIE etching process is conducted such that the interconnect trenches are etched down to the first induction coil interconnects, whereas the second induction coil trenches are not etched all the way through the second etchable insulation material layer. The second induction coil and interconnects are next fabricated into the second induction coil trenches and interconnect trenches, preferably utilizing electrodeposition techniques. Thereafter, excess induction coil material and the second induction coil etching mask are removed in a second CMP step. Thereafter, an insulation layer is deposited upon the second induction coil, followed by the fabrication of a second magnetic pole (P2) upon the insulation layer. In the preferred embodiments, the first and second etchable insulation material layers are composed of the same material.

It is an advantage of the magnetic head of the present invention that it includes multiple layered induction coils that are more reliably fabricated.

It is another advantage of the magnetic head of the present invention that it includes multiple layered induction coils having reduced spacing between coil traces due to the use of reactive ion etching techniques.

It is a further advantage of the magnetic head of the present invention that insulation between induction coil traces of multiple layered induction coils is more reliably fabricated.

It is an advantage of the disk drive of the present invention that it includes a magnetic head having multiple layered induction coils that are more reliably fabricated.

It is another advantage of the disk drive of the present invention that it includes a magnetic head that includes multiple layered induction coils having reduced spacing between coil traces due to the use of reactive ion etching techniques.

It is a further advantage of the disk drive of the present invention that it includes a magnetic head having insulation between induction coil traces of multiple layered induction coils that is more reliably fabricated.

It is an advantage of the method for fabricating a magnetic head of the present invention that a multiple layer induction coil is more easily and reliably produced.

It is another advantage of the method for fabricating a magnetic head of the present invention that the spacing between induction coil traces can be reduced by using reactive ion etching techniques.

The foregoing and other objects, features, and advantages of the present invention will be apparent from the following detailed description of the preferred embodiment which makes reference to the several figures of the drawing.

IN THE DRAWINGS

FIGS. 4–15 are side cross-sectional views depicting further fabrication steps of the present invention.

DETAILED DESCRIPTION OF THE PREFERRED EMBODIMENTS

Figure 1:
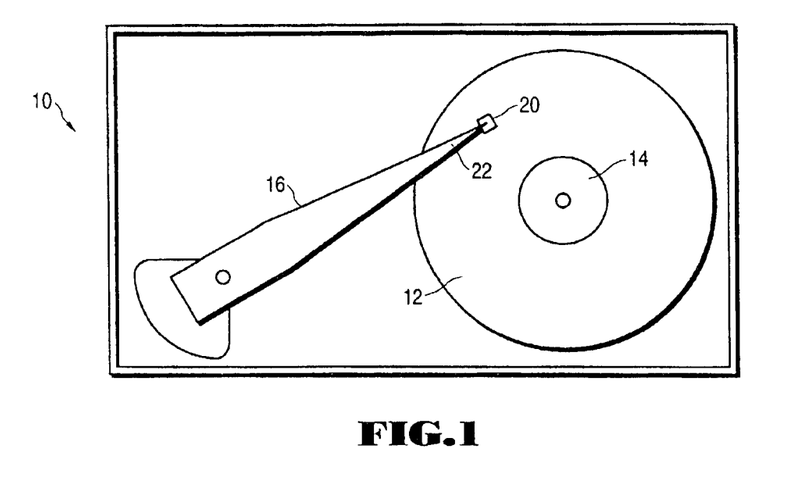
FIG. 1 is a simplified depiction of a hard disk drive of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 is formed as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
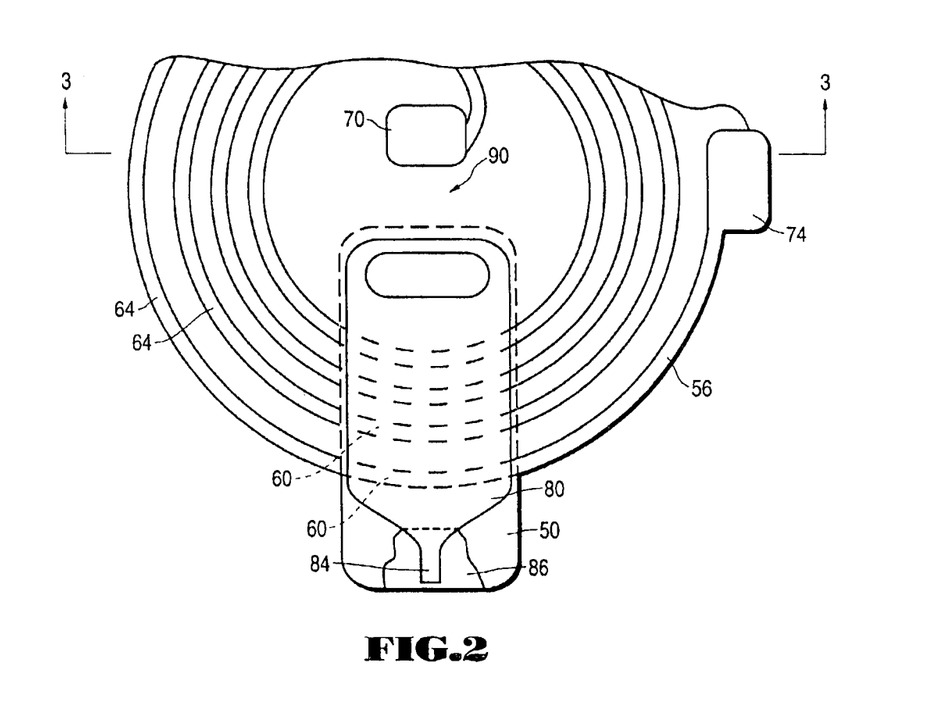
FIG. 2 is a top plan view depicting a typical prior art magnetic head and providing a view orientation that is utilized in the following figures and in describing the present invention.

FIG. 2 is a top plan view of a typical prior art magnetic head, wherein view lines 3—3 provide the orientation for the subsequent figures that depict various fabrication steps of the present invention. As depicted in FIG. 2, the typical prior art magnetic head includes a first magnetic pole (P1) 50 that has been fabricated upon an insulative magnetic shield layer of the magnetic head as is well known to those skilled in the art. Thereafter, a spiral, planar induction coil 56 is fabricated such that portions of a plurality of induction coil turns 60 are disposed above the P1 pole 50. Outer portions 64 of the induction coil turns complete the spiral induction coil 56. Typically, a first induction coil electrical interconnect 70 is formed in the central portion of the induction coil spiral and a second electrical interconnect 74 is formed at the outer edge of the induction coil 56. Following the fabrication of the induction coil 56, a second magnetic pole (P2) 80 is fabricated above the P1 pole 50 such that the portions 60 of the induction coil traces pass between the P1 and P2 magnetic poles 50 and 80 respectively. The P2 pole 80 includes a narrow P2 pole tip portion 84 that is separated from the P1 pole 50 by a thin write gap layer 86. When the write head current is fed through the electrical interconnects 70 and 74, and thus through the spiral coil 56, a magnetic flux is created within the two magnetic pole members 50 and 80 such that the magnetic flux passes through the P2 pole tip 84. The passage of the magnetic flux through the pole tip creates a magnetic field that influences the magnetic media hard disk 12 that is disposed proximate the pole tip 84, such that magnetic data bits are written onto the hard disk 12.

Efforts have been undertaken and the prior art to increase the magnetic flux that is created in the two magnetic poles by increasing the number of induction coil turns that are fabricated between the two magnetic poles 50 and 80. Such efforts have included the fabrication of multiple layered induction coils, and one application of the present invention is in a method for fabricating a multiple layer induction coil. The present invention involves fabrication steps that comprise an improvement over the prior art photolithographic fabrication methods, and these fabrication steps are next described with the aid of FIGS. 3–14 that are taken from the orientation of view lines 3—3 of FIG. 2.

Figure 3:
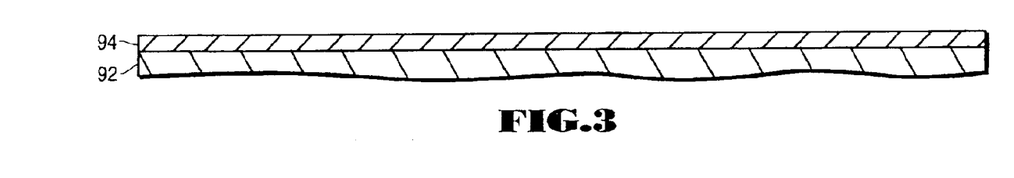
FIG. 3 is a side cross-sectional view taken along lines 3—3 of FIG. 2 of an initial fabrication step of the magnetic head of the present invention, which serves as a starting point for the detailed description thereof.

FIG. 3 is a side cross-sectional view of a fabrication step of the magnetic head 20 of the present invention which serves as a starting point for this detailed description. FIG. 3 is oriented along view lines 3—3 of FIG. 2 and depicts an initial fabrication stage following the standard fabrication of a typical P1 pole 50. As is seen by comparing FIGS. 2 and 3, the P1 pole 50 is not depicted in FIG. 3, in that the view line 3—3 is taken through a field area of the wafer substrate above the P1 pole 50. The field area 90 will generally include an insulative material layer 92, that has been deposited on the wafer surface following the P1 pole fabrication process. Thereafter, an insulative layer 94 is fabricated on top of the P1 pole 50. The layer 94 serves to prevent electrical shorting of induction coil traces that are subsequently fabricated on the layer 94, where the induction coil traces are disposed above the P1 pole. As will become clear upon further reading, the insulation layer 94 of the present invention also must act as an etch stop layer in a subsequent induction coil fabrication step; therefore, the composition of the insulative etch stop layer 94 is determined in part by the composition of other material layers that are subsequently deposited as are described hereinbelow.

Figure 4:
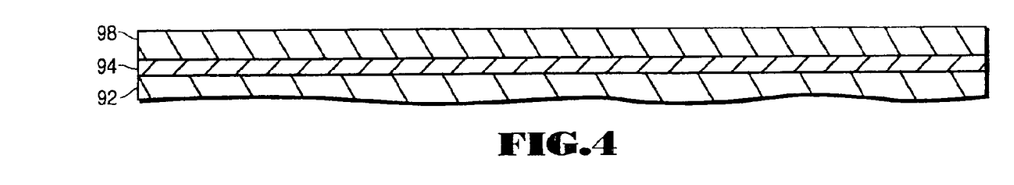
Figure 5:
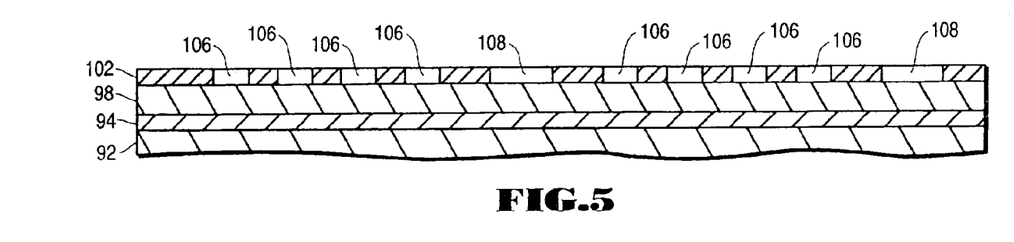

As depicted in FIG. 4, a further layer 98 of dielectric or insulation material is next deposited on top of the etch stop layer 94. The thickness of the layer 98 is generally at least as thick as the desired thickness of a first layer of induction coil traces that will be fabricated within the layer 98, as is described hereinbelow. Thereafter, as depicted in FIG. 5, a patterned etching mask 102 is fabricated upon the flat upper surface of the dielectric layer 98. The patterned mask 102 includes openings 106 for fabricating induction coil trenches and openings 108 for electrical interconnects as are next described.

Figure 6:
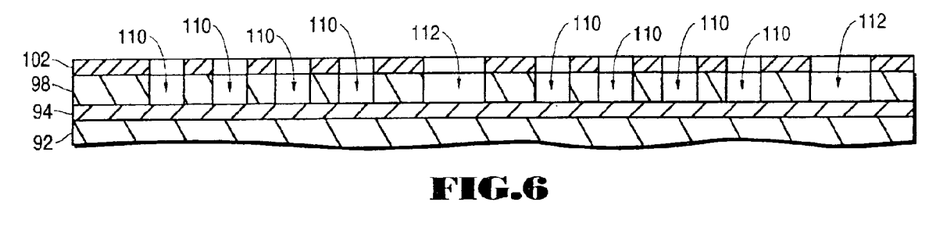

As depicted in FIG. 6, utilizing an ion etch process which is preferably a reactive ion etch (RIE) process, induction coil trenches 110 are etched through the openings 106 in the mask 102 and downward through the dielectric layer 98 to the etch stop layer 94; electrical interconnect trenches 112 are simultaneously etched through the layer 98 to the etch step layer 94. Therefore, the relationship of the materials which comprise the etch stop layer 94 and the dielectric layer 98 must be such that during the RIE step the material comprising the dielectric layer 98 is relatively easily etched, while the material comprising the etch stop layer 94 is significantly more slowly etched. The layer 98 is thus composed of an etchable insulation material. By way of example, where the etchable insulation material layer 98 is composed of an organic polymer such as a hard baked resist, a reactive ion etch process utilizing a gas such as oxygen can be utilized, and the etch stop layer 94 may consist of a substance that is substantially more difficult to etch, such as $SiO_2$ or $Al_2O_3$. Correspondingly, where the etchable insulation material layer 98 is composed of $SiO_2$, the etch stop layer 94 is preferably composed of $Al_2O_3$, and a fluorine containing gas such as $CF_4$ is utilized in the RIE process, because SiO$_2$ is substantially more easily etched by fluorine containing species than Al$_2$O$_3$.

Figure 7:
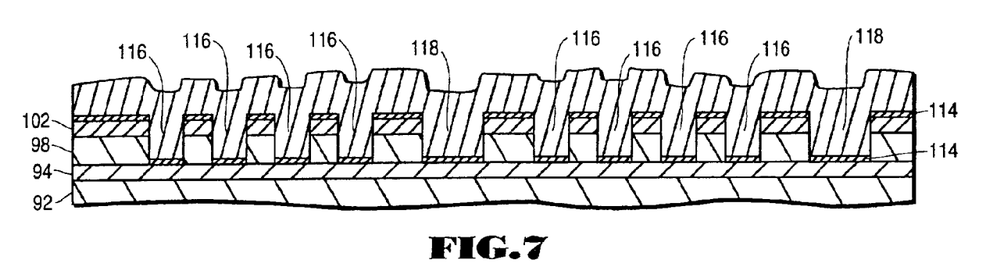
Figure 8:
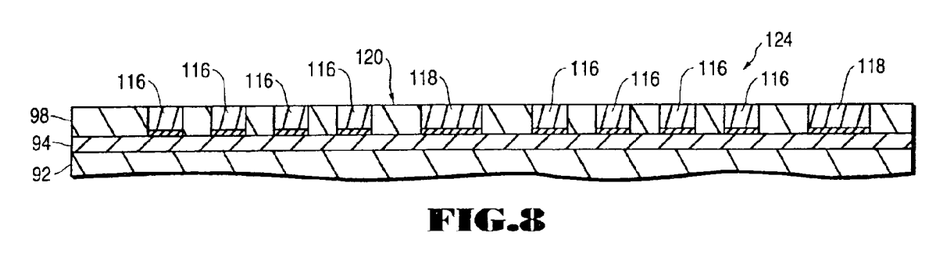

Thereafter, as depicted in FIG. 7, an induction coil structure is fabricated in the typical manner. That is, a seed layer 114, which may consist of tantalum followed by copper is sputter deposited onto the wafer to form a good electrical interconnection and physical bonding at the bottom of the trenches. Thereafter, the induction coil traces 116 and electrical interconnects 118, which are typically composed of copper, are fabricated in a standard electrodeposition process to fill the induction coil trenches 110 and the interconnect trenches 112. Thereafter, as depicted in FIG. 8, a chemical mechanical polishing step (CMP) is conducted to remove the excess copper and the RIE mask 102, such that a flat upper surface 120 is formed. It can now be seen that a first induction coil layer structure 124 has been fabricated within the etchable insulation material layer 98. Due to the excellent process control parameters that are achievable by utilizing the selective reactive ion etch process described above, the induction coil traces 116 can be accurately fabricated with minimal spacing of insulative layer material 98 therebetween. Additionally, due to the use of the RIE process in fabricating the coil trenches 110 within the etchable insulation layer 98, the insulation between the coil traces 116 is more reliably fabricated than in prior art photolithographic processes where the insulation is deposited between the coil traces after the traces have been fabricated. Having fabricated a first induction coil layer structure 124, a second induction coil layer can subsequently be fabricated upon the flat surface 120 of the first layer, as is-next described with the aid of FIGS. 9–15.

Figure 9:
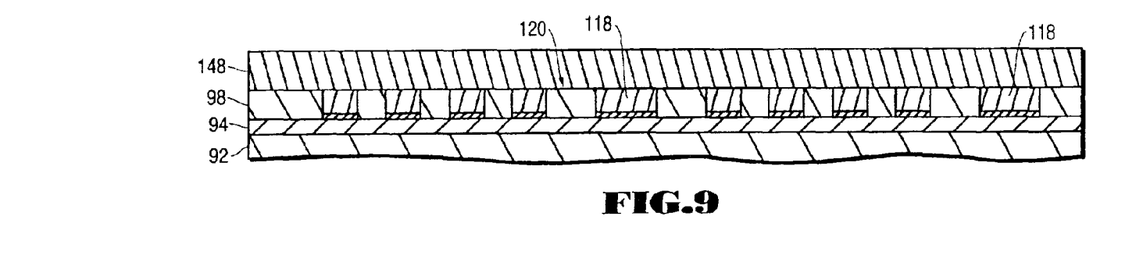
Figure 10:
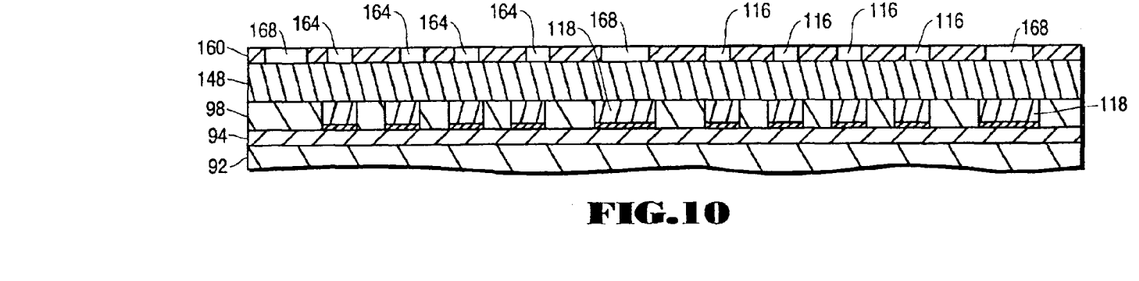

As depicted in FIG. 9, a second etchable insulation material layer 148 is deposited upon the surface 120. The thickness of the layer 148 is determined by the desired thickness of the second induction coil trenches that will be fabricated therein, as is described below. Thereafter, as depicted in FIG. 10, a patterned second induction coil etching mask 160 is fabricated upon the top surface of the layer 148. The patterned mask 160 includes openings 164 for the fabrication of a second layer of induction coil traces, and openings 168 for electrical interconnects. The electrical interconnect openings 168 are therefore fabricated in alignment with the electrical interconnects 118 of the first coil layer 124. The widths of the coil trace openings 164 relative to the widths of the electrical interconnect openings 168 are selected to take advantage of the aspect ratio dependent etching properties of the well known RIE lag phenomena, as described below with the aid of FIGS. 15 and 16.

Figure 11:
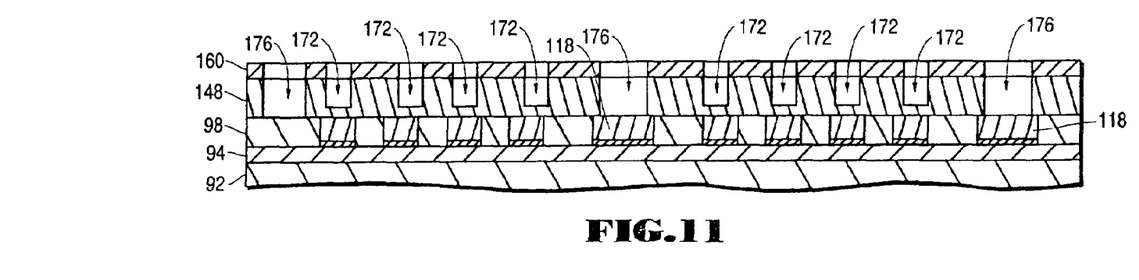

As is next depicted in FIG. 11, utilizing an ion etch process which is preferably a reactive ion etch (RIE) process, induction coil trenches 172 and interconnect trenches 176 are etched onto the layer 148. The etching of the induction coil traces 172 stops within the second etchable insulation material layer 148 to avoid electrical shorting to the first induction coil structure, whereas the etching of the interconnect trenches 176 continues until the electrical interconnects 118 of the first coil layer are reached. The widths of the openings 164 and 168, and the etching time are factors in the RIE lag phenomena that govern the depth of etching into layer 148. As described hereabove, where the second etchable insulation material layer 148 is composed of an organic polymer such as a hard baked resist, a reactive ion etch process utilizing a gas such as oxygen can be utilized. Correspondingly, where the second etchable insulation material layer 148 is composed of SiO$_2$, and a fluorine containing gas such as CF$_4$ is used in the RIE process. Additionally, in fabricating the present invention, it is desirable that the etchable insulation material layers 98 and 148 be composed of the same materials. The etch stop masks 102 and 160 are fabricated from materials that are substantially resistant to the RIE etching process, and SiO$_2$, Al$_2$O$_3$ and NiFe 80/20 are materials that can be used to fabricate the etch stop mask depending upon the RIE etchant species that is used.

Figure 12:
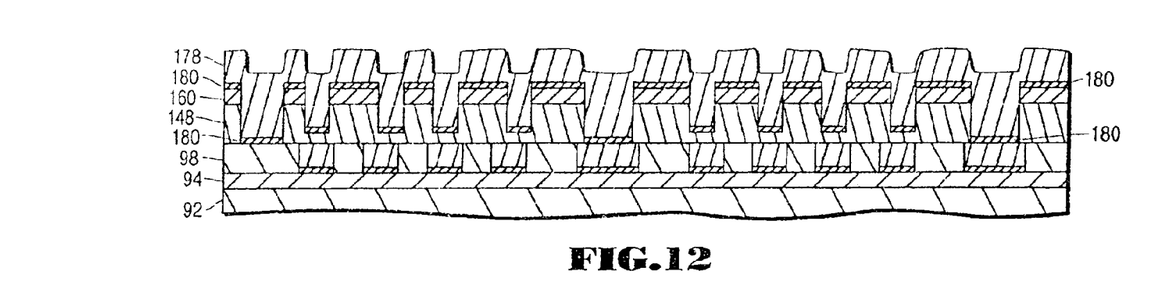
Figure 13:
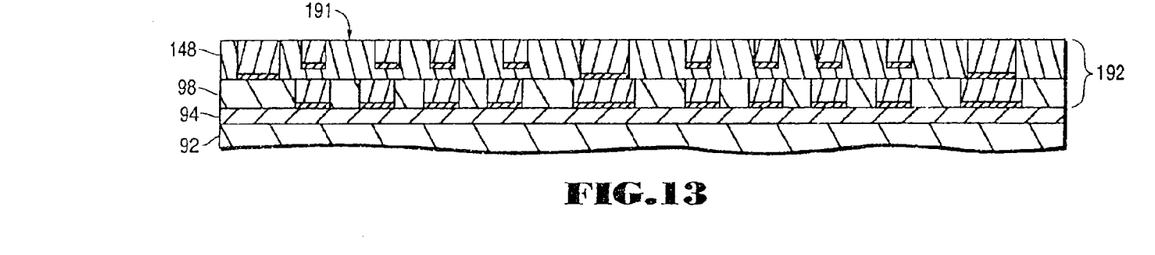
Figure 14:
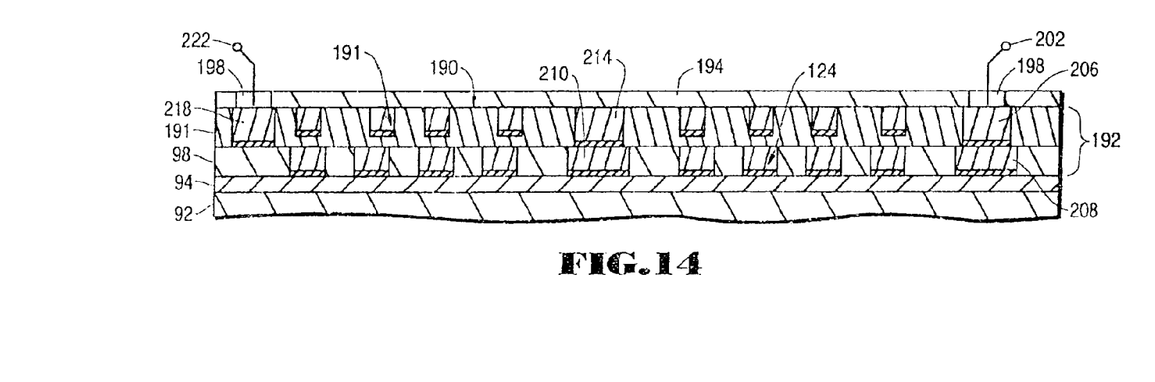

Thereafter, as depicted in FIG. 12, a second induction coil 178 is fabricated by initially depositing a seed layer 180 into the trenches 172 and 176, followed by a standard copper electrodeposition process that is well known to those skilled in the art. Thereafter, as depicted in FIG. 13, a CMP process step is conducted to remove the excess copper and the RIE mask 160, such that a flat upper surface 190 is formed. At this point, the second induction coil structure 191 has been fabricated to complete the dual layer induction coil 192 of the present invention. A patterned insulative layer 194 is next deposited upon the surface 190 to prevent the shorting of the coil traces of the second induction coil structure 191 when the P2 magnetic pole is subsequently deposited above the P1 pole on top of portions of the dual layer induction coil 192. The insulative layer 194 is patterned to include openings 198 for the electrical interconnection of the dual layer induction coil 192. Specifically, as depicted in FIG. 14, a first electrical connection 202 to the right hand electrical interconnect 206 of the dual coil structure 192 is connected to the outer traces interconnect 208 of the lower spiral coil 124. The central interconnect 210 of the lower coil 124 completes the electrical connection to the central interconnect 214 of the upper coil 191. Thereafter, the electrical connection of the upper spiral coil 191 is fed outward at the outer trace electrical coil interconnect 218 to the electrical connection 222. It is to be noted that the electrical connection of the two coil layers according to the right hand rule, results in the reinforcement of the total electromagnetic flux energy from the two coil layers 124 and 191, such that a stronger magnetic flux is created within the P1 and P2 magnetic poles of the magnetic head of the present invention.

Another embodiment is for the application of making Cu studs and straps. In this embodiment, the first pole piece, insulation and coil stack, and second pole piece are first made using the conventional method. The head structure is then encapsulated with an overcoat. Optionally, the overcoat can be planarized with CMP method. Next, a photo mask with stud and Cu lead patterns are made with the stud dimensions much greater than that of the lead pattern dimensions. Next, an RIE etching method is used to transfer the pattern into the overcoat. In a reactive ion etching process, the large features are etched faster than smaller features (high aspect ratio features). Because of the RIE lag, the etching depth of large studs and pads (for reaching coil center tap) will be deeper than the lead pattern. As a result, connection is made to the base of the Cu studs and the center tap of the coil, while the lead pattern does not short to the coil turns.

An alternative to RIE is ion milling, and by using the shadowing of the ion milling, the aspect ratio dependent etching can also be achieved. After etching, a seedlayer is deposited and followed by Cu plating to provide metalization of the patterns. Thereafter a CMP process is used to remove the excessive Cu in the field.

Figure 15:
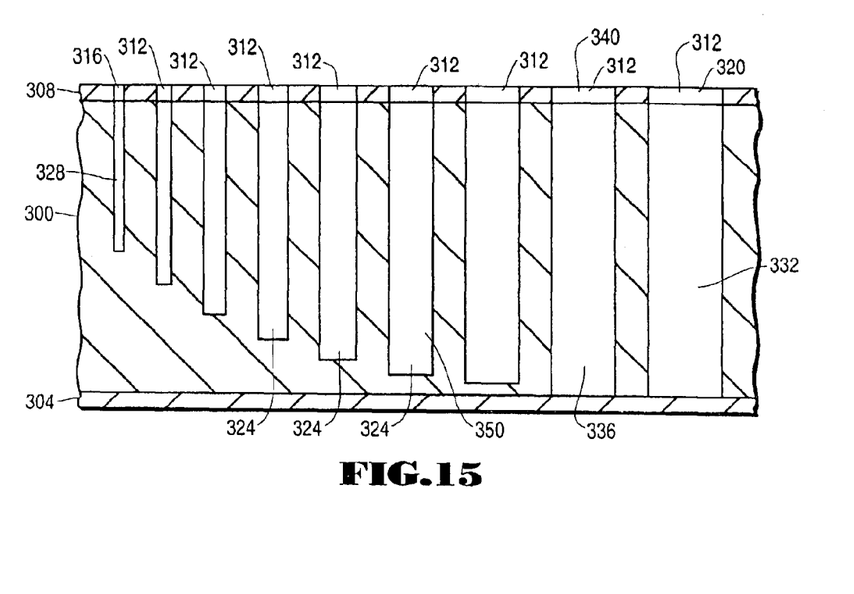
FIG. 15 is a side cross-sectional view illustrating the RIE lag phenomena.
Figure 16:
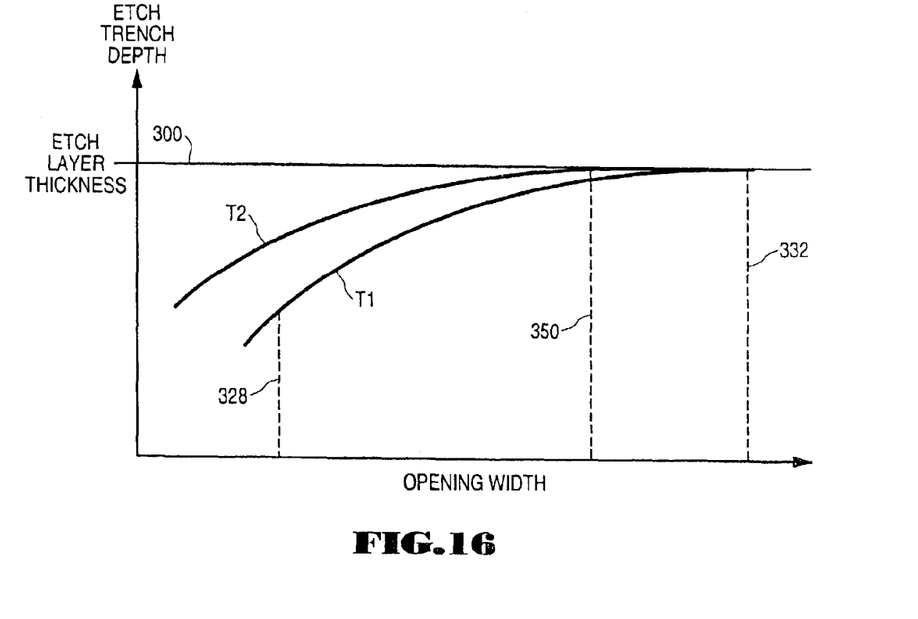
FIG. 16 is a graph depicting etched trench depths achievable using the RIE lag phenomena as a function of etching time.

FIG. 15 is a side cross-sectional view that depicts aspect ratio dependent etching of the RIE lag phenomena that is advantageously utilized in the present invention. As depicted in FIG. 15, a layer of etchable insulation material 300, such as an organic polymer or SiO$_2$ is deposited upon a nonetchable material layer 304, such as Al₂O₃, and a patterned RIE etching mask 308 is fabricated upon the etchable material layer 300. The mask 308 is formed with a series of openings 312 having gradually increasing widths, such that opening 316 is the narrowest and opening 320 is the widest. The three layer (300, 304, 308) test structure is then exposed to an RIE etching process, such as is utilized in the present invention for a specific period of time (T1), resulting in the formation of etched trenches 324 that are formed through the openings 312 downwardly into the etchable material layer 300. Owing to the RIE lag phenomena, it is seen that the trenches 324 formed through the narrower etching openings 312 are not as deep as the trenches formed through the wider of the openings 312. Specifically, the trench 328 formed through the smallest opening 316 is significantly shallower than the trench 332 formed through the widest opening 320. Additionally, it is to be noted that the trench 332 is etched entirely through the layer 300, down to the alumina layer 304, and that trench 336, although formed through an opening 340 that is each narrower than opening 320, likewise is etched entirely through the layer 300 down to the alumina layer 304. It is therefore to be understood that where the widths of openings 312 in an etching mask layer are properly selected, the depth of etching into an etchable material layer for a selected RIE process etching time can be controlled. With particular regard to the present invention, in a single fabrication step the etching mask is patterned with relatively wide openings for electrical interconnects, and relatively narrow openings for the induction coil. Thereafter, in a single RIE etching step, the large electrical interconnects are etched entirely through the insulation material layer, while the narrow induction coil trenches are etched into but not through the insulation material layer. FIG. 16 provides a graphical illustration of the RIE lag phenomena, as is next described.

FIG. 16 is a graph depicting the relationship between the width of openings 312 formed in an RIE etching mask and the depth of etched trenches for two RIE etching steps of time duration T1 and T2. The graph for time T1 corresponds to FIG. 15. That is, for a narrow opening 316 the most shallow RIE etching depth is provided, and for a wide opening 320 an etch depth 332 that reaches through the layer thickness 300 is shown. Openings 312 of various widths produce trenches of various depths for an etching time period T1. FIG. 16 also provides a second data curve representing an RIE etching process that is conducted for time T2 which is greater than time T1. The graph for time period T2 indicates that all of the trenches are etched deeper for the longer period of time T2, and that trenches for narrower openings 350 which had not etched downward completely through the etchable material layer during time T1, have etched completely through the thickness in time T2. The most narrow openings 316 has not yet etched fully through the etchable material layer 300 in time T2.

A plurality of RIE etching process parameters and magnetic head parameters must be considered in properly implementing the present invention, as will be understood by those skilled in the art upon understanding this disclosure. Such parameters include the thickness of the etchable material layer in which the induction coil traces are fabricated, the composition of the etchable material layer, the width of the relatively wider electrical interconnect openings 168, the width of the relatively narrower induction coil openings 164, which must be etched through the etchable material layer, as well as the RIE process etching time, which is a function of the RIE etching chamber parameters such as the concentration of the RIE etchant gas ion species, the process temperature and other parameters as will be known by those skilled in the art.

As a specific example of the application of the present invention in fabricating an induction coil, a first inductive coil layer 124 is fabricated, as described hereabove. Thereafter, an etchable insulation material layer 148 comprised of SiO₂ was deposited to a thickness of 3 μm. A patterned etching mask 160 composed of NiFe 80/20 was then fabricated upon the insulation material layer with a thickness of approximately 1,000 Å. The etching mask 160 included a spiral induction coil pattern having a width of approximately 1 μm, and relatively large interconnect pads that are approximately 20×30 μm. A reactive ion etching process utilizing an inductively-coupled-plasma (ICP) etcher was next undertaken. A suitable gas mixture of $CHF_3/CF_4/O_2$ was utilized with gas flows of 25, 25, and 1.5 sccm, respectively. The RIE process pressure was 2 m torr, the inductive power was 300 W and the bias power was 150 W. After a 10 minute RIE etching process the interconnects had etched entirely through the SiO₂ etchable insulation material layer 148, while the 1 μm wide induction coil trench had etched to a depth of approximately 2.2 μm. At this point the RIE etching process was terminated. Thereafter, a Ta/Cu seed layer 180 was deposited, followed by copper plating 178 to fill the interconnects and induction coil trench. A CMP process was then performed to remove the excessive copper and the NiFe mask layer. At this point the second coil layer 191 is fabricated upon the first coil layer 124 with electrical interconnects joining the two coil layers.

While the present invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What is claimed is:

1. A method for fabricating a magnetic head, comprising:
    fabricating a first magnetic pole;
    fabricating a first induction coil structure above said first magnetic pole;
    fabricating a second induction coil structure upon said first induction coil structure;
    said second induction coil structure including an etchable insulation material layer, and a plurality of second induction coil traces being fabricated therein utilizing an aspect ratio dependent etching process; wherein said aspect ratio dependent etching process includes the formation of an etching mask upon said etchable insulation material layer, wherein relatively narrow induction coil openings are fabricated in said etching mask and relatively wide electrical interconnect openings are fabricated said etching mask, and wherein a single etching process is conducted to produce induction coil trenches that project into but not through said etchable insulation material layer, and electrical interconnect trenches that project through said etchable insulation material layer;
    fabricating an insulative layer above said second induction coil structure; and
    fabricating a second magnetic pole above said insulative layer.

2. A method for fabricating a magnetic head as described in claim 1 wherein a flat surface is fabricated upon said first induction coil structure in a chemical mechanical polishing (CMP) step prior to fabricating said second induction coil structure.

3. A method for fabricating a magnetic head as described in claim 1 wherein said etchable insulation material layer is comprised of an organic polymer.

4. A method for fabricating a magnetic head as described in claim 1 wherein said etchable insulation material layer is comprised of $SiO_2$.

5. A method for fabricating a magnetic head, comprising:

fabricating a first magnetic pole layer;

fabricating a first etch stop layer above said first magnetic pole;

fabricating a first etchable insulation material layer upon said first etch stop layer;

fabricating a first induction coil etching mask upon said first etchable insulation material layer;

fabricating first induction coil trenches within said first etchable insulation material layer utilizing a reactive ion etching process;

fabricating a first induction coil within said first induction coil trenches;

fabricating a second etchable insulation material layer upon said first induction coil;

fabricating a second induction coil etching mask upon said second etchable insulation material layer;

fabricating second induction coil trenches and electrical interconnect trenches simultaneously within said second etchable insulation material layer utilizing an aspect ratio dependent reactive ion etching process;

fabricating a second induction coil within said second induction coil trenches, and fabricating electrical interconnects within said electrical interconnect trenches;

fabricating an insulation layer above said second induction coil; and fabricating a second magnetic pole above said insulation layer.

6. A method for fabricating a magnetic head as described in claim 5 wherein:

said step of fabricating said first induction coil includes electrodepositing a first induction coil within said first induction coil trenches, and removing said first induction coil etching mask by fabricating a flat surface on top of said first induction coil utilizing a chemical mechanical polishing (CMP) step; and said step of fabricating said second induction coil includes electrodepositing a second induction coil within said second induction coil trenches, and simultaneously electroplating electrical interconnects within said electrical interconnect trenches, followed by removing said second induction coil etching mask by fabricating a flat surface above said second induction coil utilizing a CMP step.

* * * * *